United States Patent [19]

Nelson et al.

[11] Patent Number: 5,298,964
[45] Date of Patent: Mar. 29, 1994

[54] OPTICAL STRESS SENSING SYSTEM WITH DIRECTIONAL MEASUREMENT CAPABILITIES

[75] Inventors: Bruce N. Nelson, South Boston; Malcolm C. Smith, Holliston, both of Mass.

[73] Assignee: Geo-Center, Inc., Newton Centre, Mass.

[21] Appl. No.: 861,223

[22] Filed: Mar. 31, 1992

[51] Int. Cl.$^5$ .............................................. G01L 1/24
[52] U.S. Cl. .................................. 356/33; 73/862.624; 73/800; 356/364
[58] Field of Search .................... 356/33, 34, 35, 364, 356/366, 367; 250/231.19, 225; 73/862.624, 705, 800

[56] References Cited

U.S. PATENT DOCUMENTS

| | | |
|---|---|---|
| Re. 28,971 | 9/1976 | Kumada et al. . |
| 2,768,557 | 10/1956 | Bond . |
| 3,481,661 | 12/1969 | Harris . |
| 3,536,375 | 10/1970 | Mansell . |
| 3,838,906 | 10/1974 | Kumada . |
| 3,950,987 | 4/1976 | Slezinger et al. ...................... 356/33 |
| 4,269,483 | 5/1981 | Feldtkeller . |
| 4,343,536 | 8/1982 | Watanabee et al. . |
| 4,403,352 | 10/1983 | Huignard et al. .................... 455/601 |
| 4,465,969 | 8/1984 | Tada et al. .............................. 324/96 |
| 4,504,121 | 3/1985 | Carlsen et al. . |
| 4,554,449 | 11/1985 | Taniuchi et al. ...................... 250/227 |
| 4,563,093 | 1/1986 | Tada et al. ............................ 356/368 |
| 4,595,876 | 6/1986 | Kuhara et al. ......................... 324/96 |
| 4,631,402 | 12/1986 | Nagatsuma et al. ................. 250/231 |
| 4,694,243 | 9/1987 | Miller et al. . |
| 4,698,497 | 10/1987 | Miller et al. ........................... 250/231 |
| 4,734,576 | 3/1988 | Agoston et al. ..................... 250/225 |
| 4,777,358 | 10/1988 | Nelson ................................... 73/800 |
| 4,784,473 | 11/1988 | Gookin . |
| 4,919,522 | 4/1990 | Nelson . |
| 5,090,824 | 2/1992 | Nelson et al. ......................... 385/22 |
| 5,109,189 | 4/1992 | Smith ..................................... 324/96 |

FOREIGN PATENT DOCUMENTS 748654 10/1966 Canada .

OTHER PUBLICATIONS

"Final Technical Report, Fast Optical Switch for Mulimode Fiber Optic Based Control Systems, Phase I." Prepared by Geo-Centers, Inc., under Contract No. NAS-25615, Aug., 1989.
"Non-Invasive Electro-Magnetic Field Sensor," Nelson et al., AFWAL-TR-86-3051, Final Report, AF Wright Aeronautical Laboratories, Jan., 1986.
"Fibre Optic Electric Field Sensor Using the Electrooptic Effect $Bi_4Ge_3O_{12}$," K. Shibata, Published by IEE, Given at the First International Conference on Optical Fibre Sensors. Apr. 26, 1983.
"Electro-Optic Effect Of Zincblende," S. Namba, Journal of the Optical Society of American, vol. 51, No. 1, pp. 148-151, Jan. 1961.

Primary Examiner—Richard A. Rosenberger
Attorney, Agent, or Firm—Wolf, Greenfield & Sacks

[57] ABSTRACT

A stress sensor having directional measurement capabilities based on the photoelastic effect in isotropic photoelastic materials. Directional measurement capability is achieved in the sensor by the incorporation of three different optical axes passing through the photoelastic element. This creates three independent stress sensors which utilize a single sensing element. Each of the three independent stress sensors are sensitive to applied stress in different directions. The response of each of the sensors is analyzed and the magnitude and direction of incoming stress is determined. The use of a sum-difference output detection scheme results in immunity to light source intensity variations, optical fiber microbending losses, and fiberoptic connector losses. The stress sensor is immune to electromagnetic interference (EMI) and electromagnetic pulse (EMP), and is compatible with fiberoptic data transmission and control lines.

24 Claims, 6 Drawing Sheets

OPTICAL STRESS SENSING SYSTEM WITH DIRECTIONAL MEASUREMENT CAPABILITIES

BACKGROUND OF THE INVENTION

1. Field of the Invention

The present invention relates generally to the field of optical measuring devices. More particularly, the present invention pertains to a photoelastic stress sensor having directional measurement capabilities.

2. Discussion of the Related Art

True directional stress measurement capability is not achieved with any present commercially available sensor technology. Within this specification, the term "stress" is defined as the force acting on an area in a solid and includes pressure type stresses and dynamic stress waves in materials. Stress as used herein also includes both short or long duration phenomena.

Stress is one of the most common parameters measured in a wide variety of fields. Stress measurements are used to assess the strength of materials, direction of applied forces, and duration of applied forces, to cite just a few of the many applications. In explosive testing, for example, stress measurement transducers are used to monitor shock wave propagation in soils, rock, and fluids. Stress measurements are utilized to characterize explosives and to quantify the environment to which selected targets are exposed. Stress measurements may be also used to characterize the thermal (through X-ray deposition) induced shock waves in new materials under development, such as composite materials, metal alloys, and ceramics.

Conventional stress measurement transducers incorporate piezoelectric or piezoresistive sensing elements. Transducers capable of monitoring explosion induced stress waves and pressures have been developed based on the piezoelectric effect in materials such as quartz and PVF (polyvinyl fluoride), and the piezoresistive effect in materials such as carbon and ytterbium.

However, conventional stress sensors, regardless of the application in which they are used, are sensitive to stress applied only in a single direction. This imposes a strict requirement to accurately position the attitude of the stress measurement transducer prior to a measurement. If the transducer is not properly oriented with respect to the direction of the applied stress, then the transducer may not accurately measure the magnitude of the applied stress. Furthermore, since the direction of the applied stress must be known in advance of a measurement, these prior art sensors cannot be used on moving devices, such as robots, to sense acoustic pressures impinging on the moving device or to measure stresses caused by another moving device.

Additional difficulties with piezoelectric and piezoresistive stress measurement transducers occur because these sensors are electronic in nature. These types of sensors are sensitive to the adverse effects of electromagnetic interference (EMI) and electromagnetic pulse (EMP) which can cause errors in the sensed stress magnitude.

SUMMARY OF THE INVENTION

The present invention overcomes the disadvantages of the prior art by providing a stress sensing system having directional measurement capabilities based on the photoelastic effect in isotropic photoelastic materials. Directional measurement capability is achieved in the sensing system by the incorporation of three predetermined, different optical axes or paths passing through the photoelastic sensing element in combination with a predetermined configuration of optical elements. In a preferred embodiment, the sensing element is a monolithic, planar sensing element. Each of the three optical axes create an independent stress sensor in a single sensing element. The use of a single sensing element avoids perturbations and interactions among different discrete sensing elements, as well as assembly and alignment problems, and thus enhances sensor accuracy and usefulness. Each of the three independent stress sensors is sensitive to applied stress in different directions. Means are provided which analyze the response of each of the sensors and determine the magnitude and direction of an incoming stress wave. The use of a sum-difference output detection scheme results in immunity to light source intensity variations, optical fiber microbending losses, fiber optic connector losses and connection to-connection nonrepeatabilities, and the effects of radiation fiber darkening. The stress sensor provides immunity to EMI and EMP, and immediate compatibility with fiber optic data transmission and control lines.

The directional measurement capabilities of the sensing system eliminate the requirement to accurately position the stress transducer's attitude, since the directional measuring capability of the sensing system can compensate for misalignment. The directional measurement capabilities of the present invention determine the magnitude and direction of an incoming stress wave by exploiting the "off-axis" sensitivity of the stress sensors. Due to the particular orientation of optics and the particular light paths chosen, in a preferred embodiment, as the sensitivity to an incoming stress wave decreases along one axis (due to off-axis loading), it increases along another, thus allowing the sensing system to sense stress applied in different directions without changing the position of the stress sensing transducer.

Inclusion effects (the effect of the gauge itself on the stress wave to be measured) can be compensated for since vector stress measurements can be made within the stress transducer itself, thus improving transducer measurement accuracy.

In one application of the present invention, the directional measurement capabilities allow better characterization of the shock wave susceptibility of "insensitive" munitions to explosion induced shock waves. In this application, the stress sensing system locates the direction of explosion sources allowing identification of devices ignited by the initial shock wave.

Additional applications for the present invention include locating buried personnel in avalanches, earthquake rubble, and collapsed buildings. The present invention may also be utilized to provide robots with improved perception through the use of directional "hearing". That is, using the present invention, a robot can determine the magnitude and direction of incoming acoustic pressures. This can be used for collision detection and avoidance, steering, or command and control.

The sensing system of the present invention can be used in many different applications, such as, assessing the strength of materials, the direction and duration of applied forces, explosives testing (both conventional and nuclear), acoustic measurements, sonar measurements, robotics, air blast measurements, and submarine detection, to name just a few.

In one embodiment of the invention, a sensing element is used which includes a monolithic isotropic material exhibiting stress induced birefringence. Three optical paths through the sensing element are established, with each optical path having a known directional sensitivity to applied stress. Means for measuring the optical response of each of the first, second, and third optical paths to applied stress is provided. Determining means, responsive to the measuring means are provided, for determining a magnitude and a direction of the applied stress. The sensing element exhibits stress induced birefringence to produce a set of fast and slow optical axes in the sensing element in response to the applied stress. The determining means determines an orientation of the set of fast and slow optical axes in the sensing element to determine the magnitude and direction of the applied stress.

In another embodiment of the invention, polarization control optics are interposed between the source of light and the stress measurement transducer to reduce the inherent light loss of the sensor, thereby reducing the insertion light loss of the sensor.

The features and advantages of the present invention will be more readily understood and apparent from the following detailed description of the invention, which should be read in conjunction with the accompanying drawings, and from the claims which are appended at the end of the detailed description.

BRIEF DESCRIPTION OF THE DRAWINGS

In the drawings, wherein like elements have been given like reference characters, FIG. 1 schematically depicts a prior art single axis photoelastic stress sensing system.

DETAILED DESCRIPTION

For purposes of illustration only and not to limit generally, the present invention will now be explained with reference to a stress sensing system having directional measurement capabilities which uses a rectangular parallelepiped type crystal sensing element as part of the transducer and a specific orientation of the optical paths through the sensing element. However, one skilled in the art will appreciate that the crystal geometry and the choice of optical paths may be changed in order to accommodate different stress sensing requirements.

Figure 1:
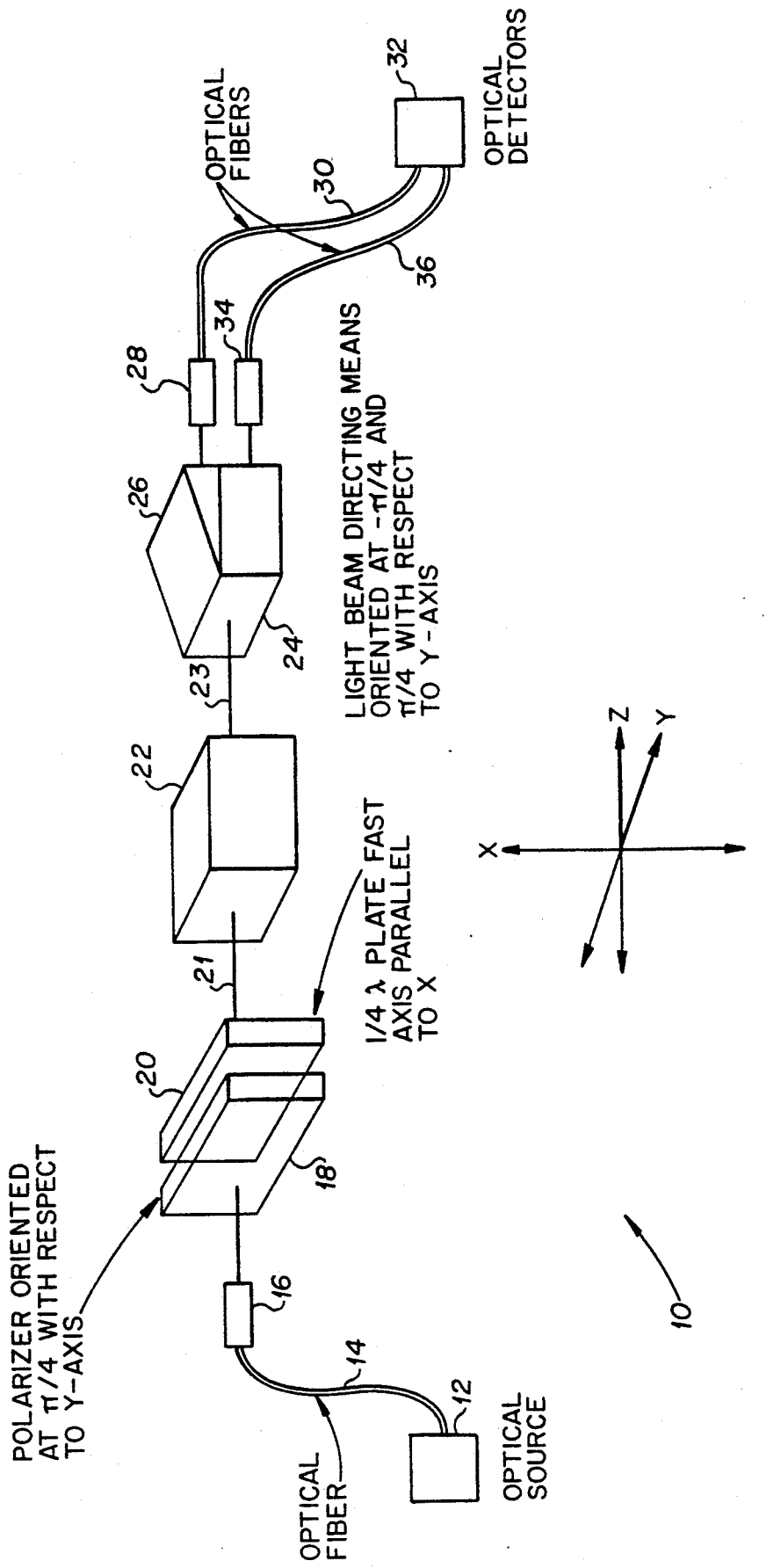

Reference is now made to FIG. 1, which illustrates the basic arrangement of a prior art optical photoelastic stress sensing system. The stress sensing system 10 in FIG. 1 uses light provided by optical source 12 which light is preferably of a single wavelength or of a narrow spectrum, such as that from a light emitting diode (LED) or the like. Optical source 12 may be a laser of the type that emits light that is principally of one wavelength. However, the light emitted by optical source 12 can be incoherent, such as the light produced by an LED.

The light from optical source 12 is transmitted along optical fiber 14 to a collection means 16. Collection means 16 may be any type of collimating lens such as a grin rod (graded index) lens available under the tradename SELFOC ® or a refractive lens. Light emerging from collimating means 16 is a collimated light beam that is transmitted to polarizer 18 along the Z-axis. The light emerging from polarizer 18 is plane polarized light that is transmitted to quarter-wave plate 20. In the particular configuration illustrated in FIG. 1, polarizer 18 is oriented at $\pi/4$ with respect to the Y axis in the Y-X plane. Thus, the light emerging from polarizer 18 is plane polarized at $\pi/4$ with respect to the Y axis. The plane polarized light emerging from polarizer 18 is transmitted to quarter-wave plate 20. In the sensor illustrated in FIG. 1, quarter-wave plate 20 is oriented so that its fast axis is parallel to the X axis in the Y-X plane. Thus, the light emerging from quarter wave plate 20 is circularly polarized.

The light 21 emerging from quarter-wave plate 20 is transmitted to photoelastic sensing element 22. Photoelastic sensing element 22, as will be explained in greater detail hereinafter, is an isotropic material which does not have well-defined sets of "fast" and "slow" optical axes. The light 23 emerging from photoelastic sensing element 22 is transmitted to light beam directing means 24 which may be, for example, a beam splitting polarizer. Light beam directing means 24 may be any optical device which can direct light having orthogonal planes of polarization in different directions. I the particular configuration illustrated in FIG. 1, the beam splitting polarizer is oriented such that its planes of polarization are oriented at $-\pi/4$ and $+\pi/4$ with respect to the Y axis in the X-Y plane. If the polarization of the emerging light beam 23 is oriented at $-\pi/4$ with respect to the Y-axis in the X-Y plane, the beam splitting polarizer 24 will direct the light along a direction parallel to the X axis so that the light beam is directed into a prism 26. Prism 26 acts to reflect entering light to collimating means 28. One skilled in the art will appreciate that prism 26 is not required, but is included to reduce the physical size of the stress sensing system. The light emerging from prism 26 is transmitted to a collection means 28 (which may be the same as collimating means 16) and then to optical fiber 30. Light transmitted by optical fiber 30 is detected by optical detector 32.

On the other hand, if the light beam emerging from photoelastic transducer 24 is polarized so that its plane of polarization is oriented at $\pi/4$ with respect to the Y-axis in the X-Y plane, beam splitting polarizer 24 will pass the light beam straight through along the Z-axis to a collection means 34 (which may be the same as collimating means 16) which interfaces the light beam to optical fiber 36. Light transmitted by optical fiber 36 is detected by optical detector 32.

When stress is applied to photoelastic sensing element 22 in the X direction, the index of refraction of photoelastic sensing element 22 increases along that direction, while the index of refraction along the Y direction remains constant. A beam of light polarized along the X direction propagates at a slower speed through photoelastic sensing element 22 than a beam of light polarized along the Y direction. Consequently, the X axis is known as the "slow" axis and the Y axis is known as the "fast" axis. If the light beam is initially polarized at $\pi/4$ with respect to the X-Y axes, by polarizer 18 for example, then a phase shift will occur between the components of the light beam that are parallel to each of these axes. The amount of phase shift is proportional to the magnitude of the applied stress and the thickness of photoelastic sensing element 22. The amount of phase shift is referred to as stress-induced birefringence.

In the sensing system configuration shown in FIG. 1, when no stress is applied, one half of the light intensity present in light beam 23 is transmitted into optical fiber 30 and the remaining one half of the light intensity present in light beam 23 is transmitted into optical fiber 36. A change in the applied stress results in a change in optical transmission, which results in a change in the relative proportions of light intensity transmitted through optical fibers 30 and 36. Optical detector 32 detects the change in relative light intensity being transmitted through optical fibers 30 and 36. For this configuration, the output intensity I for light oriented at $\pi/4$ and $-\pi/4$ with respect to the X-Y plane is given by:

$$I_{\pi/4} = I_o \operatorname{SIN}^2 (\Gamma(S)/2 - \pi/4) \quad (1)$$

$$I_{-\pi/4} = I_o \operatorname{SIN}^2 (\Gamma(S)/2 + \pi/4) \quad (2)$$

where:
$I_o$ = input optical intensity
$\Gamma(S)$ = stress induced birefringence The stress induced birefringence $\Gamma(S)$ in an isotropic photoelastic material as a function of the applied stress is described by the following equation:

$$\Gamma(S) = \left(\frac{2\pi t}{f}\right) S \quad (3)$$

where:
t = the optical thickness of the photoelastic material in inches
f = the stress optic coefficient (psi/fringe/in)
S = the applied stress in pounds per square inch (psi)

Equation (3) indicates that the stress induced birefringence, and therefore the sensing range and sensitivity of the stress sensing system is dependent on the material geometry.

Equations (1) and (2) can be rewritten in the following form:

$$I_{\pi/4} = (I_o/2 - I_o \operatorname{SIN} (\Gamma(S)/2) \operatorname{COS} (\Gamma(S)/2) \quad (4)$$

$$I_{-\pi/4} = (I_o/2 + I_o \operatorname{SIN} (\Gamma(S)/2) \operatorname{COS} (\Gamma(S)/2) \quad (5)$$

Taking the sum and difference of equations (4) and (5) yields:

$$I_{sum} = (I_{\pi/4} + I_{-\pi/4}) = I_o \quad (6)$$

$$I_{diff} = I_{-\pi/4} - I_{\pi/4} = 2I_o \operatorname{SIN} (\Gamma(S)/2) \operatorname{COS} (\Gamma(S)/2) \quad (7)$$

Thus, the sum-difference stress sensing system output becomes:

$$\begin{aligned}
\text{sum-difference output} &= \frac{I_{diff}}{I_{sum}} \\
&= 2 \operatorname{SIN}(\Gamma(S)/2)\operatorname{COS}(\Gamma(S)/2) \\
&= \operatorname{SIN}(\Gamma(S))
\end{aligned} \quad (8)$$

which is the sine of the stress-induced birefringence $\Gamma(S)$.

Equation (8) demonstrates that the sum-difference stress sensor output is intensity invariant. Thus, the sum-difference is the presently preferred output detection scheme for the photoelastic stress sensing system. This detection scheme provides enhanced operating characteristics in environments where light intensity variations or radiation darkening of the photoelastic sensing element or other optical components may reduce performance.

Figure 2:
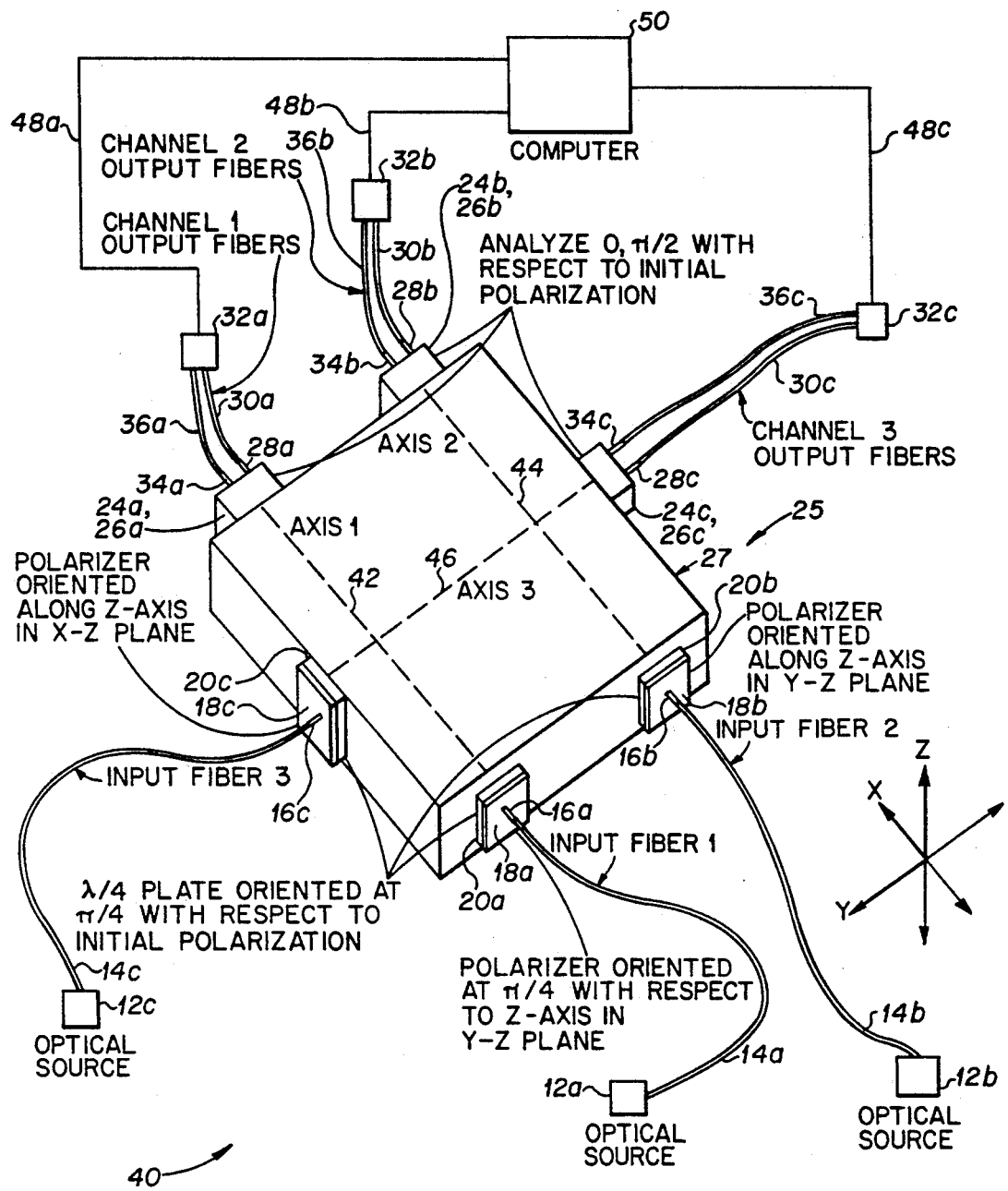
FIG. 2 is a schematic block diagram of a stress sensing system having directional measurement capabilities of the present invention.

Reference is now made to FIG. 2, which figure illustrates a photoelastic stress sensing system 40 having directional measurement capabilities. As will be explained in greater detail hereinafter, in a preferred embodiment, the particular light paths through the sensing element in combination with the particular orientations of the polarizing and analyzing optics allow the present invention to have directional measurement capabilities when using a planar sensing element.

In the stress sensor 40 having directional measurement capabilities, as illustrated in FIG. 2, photoelastic transducer 25 includes a photoelastic material which is isotropic and does not have well defined sets of fast and slow axes. Photoelastic sensing element 27 which forms part of photoelastic transducer 25 is configured to be small in size relative to variations in the stress field applied to the transducer so that the applied stress may be considered homogenous. Furthermore, the length and width of photoelastic sensing element 22 (in the X and Z directions) are preferably equal so that the equations (to be discussed hereinafter) developed in accordance with the directional measurement technique of the present invention may be used without correction factors. The height or thickness of photoelastic sensing element 22 is not important to the novel directional measurement technique of the present invention, but is important in determining the sensitivity and bandwidth of the stress sensor.

Photoelastic sensing element 27 may be chosen from materials such as glasses, plastics, and rubbers, as long as the particular material is optically transparent and isotropic for the particular frequency of light that is to be passed through the material. Choosing a particular sensing material and particular transducer geometry allows the stress sensing system of the present invention to be tailored to a wide variety of stress measurement applications. The sensing system of the present invention can be designed with a fast or slow data rate and can possess a bandwidth from DC to approximately 10 MHz. Table 1 lists stress optic coefficients of exemplary optical glasses which may be used in transducer 25 as the photoelastic sensing element 27.

TABLE 1

| STRESS OPTIC COEFFICIENTS OF OPTICAL GLASSES | |
|---|---|
| Material | Stress Optic Coefficient (psi/fr/in) |
| SF-57 | 33,100 |
| Plate Glass | 1,330 |
| BSC-2 (Boro-Silicate Crown) | 1,140 |
| Fused silica | 900 |

Stress sensing system 40 in FIG. 2 has three separate optical paths 42, 44, and 46 established through photoelastic sensing element 27. Each of the optical paths has a grin rod lens 16a, 16b, 16c which couples optical fiber 14a, 14b, 14c to optical paths 42, 44, 46 respectively. Each grin rod lens is coupled to a polarizer 18a, 18b, 18c. Each optical path also uses a beam splitting polarizer 24a, 24b, 24c, a prism 26a, 26b, 26c, and grin rod lenses 28a, 28b, 28c and 34a, 34b, 34c to couple the output from each optical path to optical fibers 30a, 30b, 30c and 36a, 36b, 36c, respectively. Optical detectors 32a, 32b, 32c are provided which detect intensity variations of the light transmitted by each of the output optical fibers. Signals indicating light intensity variations between a pair of optical fibers 30a, 30b, 30c and 36a, 36b, 36c are transmitted via respective connections 48a, 48b, 48c to computer 50. Computer 50 processes signals received from each of the optical detectors to determine the magnitude and direction of an incident stress wave as will be explained in more detail hereinafter. Optical sources 12a, 12b, 12c provide the required light. One skilled in the art will appreciate that optical sources 12a, 12b, 12c could also be a single optical source with appropriate beam splitting to supply light for each of the optical paths 42, 44, 46 respectively.

Each of the optical paths 42, 44, 46 is sensitive to both the stress level and its direction. By providing the appropriate polarizations along each of the optical paths, the appropriate orientations of the optical paths through the sensing element, and a method by which to analyze the output signals from each of the optical paths, the magnitude and direction of applied stress may be uniquely determined.

In optical path 42, polarizer 18a is oriented at $\pi/4$ with respect to the Z-axis in the Y-Z plane so that an initial polarization of the light beam emerging from polarizer 18a is $\pi/4$ with respect to the Z-axis. Quarter-wave plate 20a has its fast axis oriented at $\pi/4$ with respect to the initial polarization, thus making the fast axis of quarter-wave plate 20a oriented along the Z-axis. Beam splitting polarizer 24a is oriented at 0 and $\pi/2$ with respect to the initial polarization of the light beam emerging from polarizer 18a. Thus, optical path 42 is most sensitive to stress applied along the Y direction.

In optical path 44, polarizer 18b is oriented parallel to the Z axis in the Y-Z plane so that an initial polarization of the light beam emerging from polarizer 18b is parallel to the Z-axis in the Y-Z plane. Quarter-wave plate 20b has its fast axis oriented at $\pi/4$ with respect to the initial polarization, thus making the fast axis of quarter-wave plate 20b oriented at $\pi/4$ with respect to the Z axis in the Y-Z plane. Beam splitting polarizer 24b is oriented at 0° and 90° with respect to the initial polarization of the light beam emerging from polarizer 18b.

In optical path 46, polarizer 18a is oriented parallel to the Z axis in the Y-Z plane so that an initial polarization of the light beam emerging from polarizer 18c is parallel to the Z axis in the X-Y plane. Quarter-wave plate 20c is oriented at $\pi/4$ with respect to the initial polarization, thus making the fast axis of quarter wave plate 20c oriented at $\pi/4$ with respect to the Z axis in the X-Z plane. Beam splitting polarizer 24c is oriented at 0° and 90° with respect to the initial polarization of the light beam emerging from polarizer 18c.

As noted previously, an isotropic material initially has uniform indices of refraction in all directions in the material. An incoming stress wave perturbs the index of refraction in the material. The index of refraction increases along the direction of stress propagation. In the sensing system illustrated in FIG. 2, the fast and slow axes induced in the material are respectively aligned with and orthogonal to the direction of the applied stress.

Each path in the stress sensing system of FIG. 2 acts as an independent stress sensor with its own directional sensitivity. For compressional stress waves and the geometrical configuration shown in FIG. 2, the following relationships were found between the three independent sensors sum difference outputs, the induced birefringence, and the angle of incidence of the applied stress:

$$SD_1 = [SIN\ \Gamma(S)][(COS^2\theta - (SIN^2\phi SIN^2\theta)] \quad (9)$$

$$SD_2 = [SIN\ \Gamma(S)][SIN2\theta SIN\phi] \quad (10)$$

$$SD_3 = [SIN\ \Gamma(S)][SIN2\theta COS\phi] \quad (11)$$

where:
- $SD_1$ = measured sum difference output for optical path 42
- $SD_2$ = measured sum difference output for optical path 44
- $SD_3$ = measured sum difference output for optical path 46
- $SIN(\Gamma(S))$ = the stress induced birefringence amplitude
- $\phi$ = the angle from the X axis in the X-Y plane
- $\theta$ = the angle with the Z-axis Equations (9), (10), and (11) provide three equations in terms of three unknowns ($\Gamma(S)$, $\theta$, $\phi$) which allow the birefringence amplitude (and therefore the stress amplitude), and the two angles which define the direction of the incoming stress waves to be uniquely determined. As equations (9), (10), and (11) demonstrate, the present invention uses the sum-difference measurement technique in combination with three equations in three unknowns and takes into account the off axis loading of a uniaxial photoelastic stress sensor to perform directional analysis. Computer 50 can be programmed using linear regression or iterative techniques to simultaneously solve equations (9), (10), and (11). The choice of the particular optical paths and the orientation of various optical components illustrated in FIG. 2 allow equations (9), (10), and (11) to be used and solved without the need for any special correction factors. However, different optical path orientations and corrective modifications to equations (1)-(11) can be used to accommodate different stress sensing applications.

Figure 3:
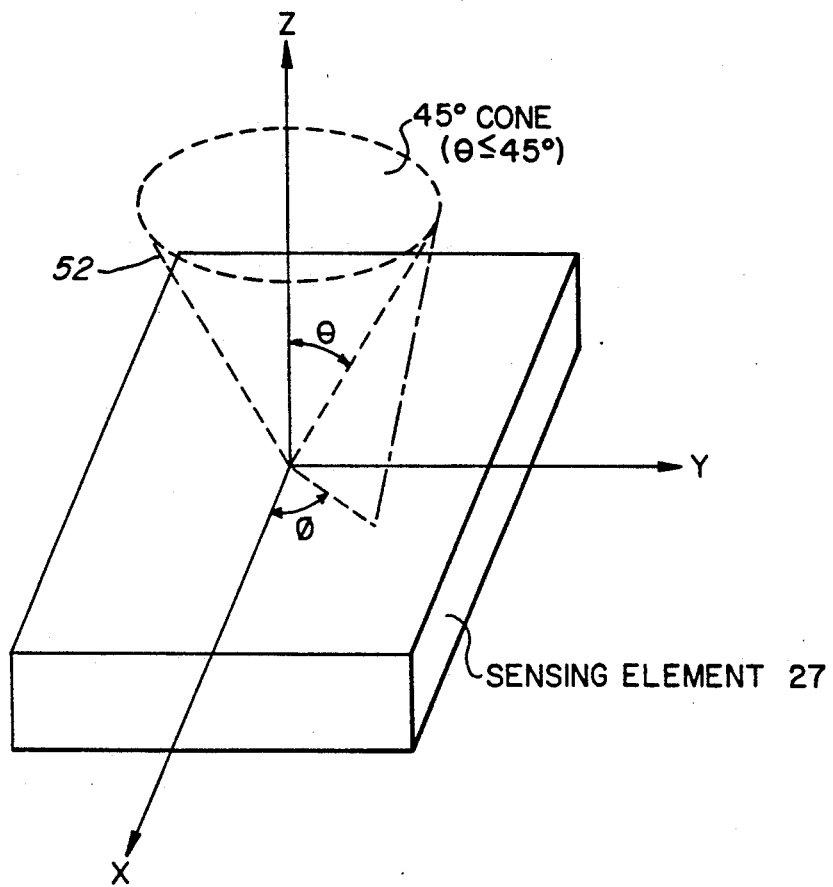
FIG. 3 illustrates the resulting sensitivity and directional measurement capabilities of the sensing system illustrated in FIG. 2.

Referring now to FIG. 3, photoelastic sensing element 27 is shown with X, Y, and Z axes superimposed thereon. FIG. 3 illustrates that the angle $\theta$ is the angle the applied stress makes with the Z-axis and that the angle $\phi$ is the angle the applied stress makes with the X-axis in the X-Y plane. The present invention, by simultaneously solving equations (9), (10), and (11) for $\Gamma(S)$, $\theta$, $\phi$, is thus able to uniquely determine the direction of the applied stress and the magnitude of the applied stress within a cone 52 oriented at +45° around the Y axis (i.e., $\theta \leq 45°$). Thus, as long as the incoming stress wave falls within 45° cone 52, the present invention can determine the magnitude and direction of the applied stress wave.

The intensity I of light passing through beam splitting polarizers 24a, 24b, 24c of the stress sensing system is a function of the intensity of light incident on the photoelastic sensing element 27.

Expressed mathematically, the intensity I of the light beam transmitted through optical fibers 36a, 36b, 36c in the stress sensing system illustrated in FIG. 3 is given by:

$$I_{\pi/4} = I_o \sin^2(\Gamma(S)/2 - \pi/4) \quad (12)$$

where: $I_o$ is the intensity of the light incident on respective polarizers 18a, 18b, 18c.

The intensity I of the light beam transmitted through optical fibers 30a, 30b, 30c in the stress sensor illustrated in FIG. 3 is given by:

$$I_{-\pi/4} = I_o \sin^2(\Gamma(S)/2 + \pi/4) \quad (13)$$

Since the light entering respective polarizers 18a, 18b, 18c is randomly polarized, there is an immediate loss of light intensity of 3 dB. That is, one-half of the input light intensity $I_o$ is lost when passing through respective polarizers 18a, 18b, 18c since the polarizers only transmit light which is parallel to the plane of polarization of the polarizer.

Figure 4:
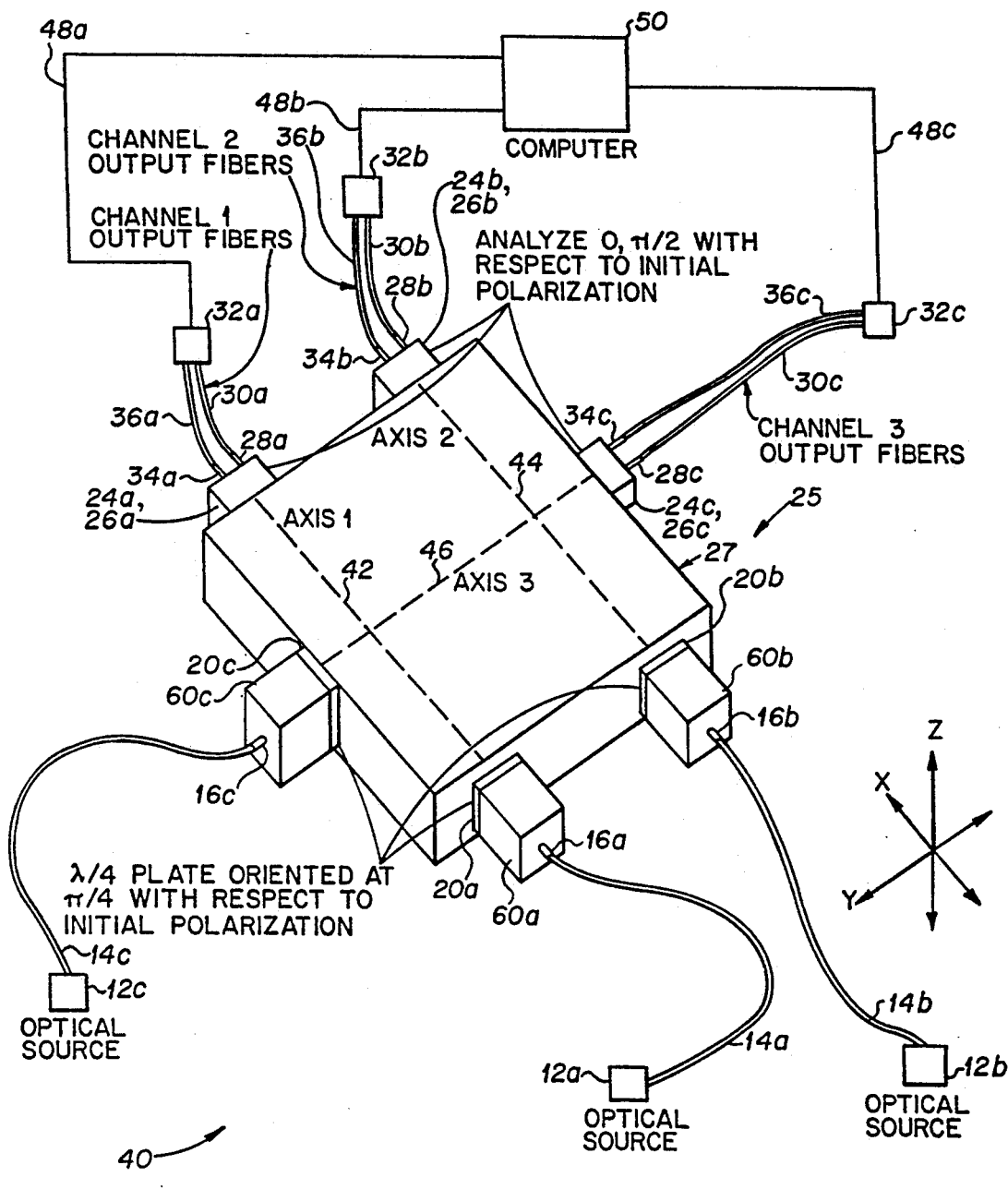
FIG. 4 is a schematic block diagram illustrating the use of polarization control optics in the stress sensor illustrated in FIG. 2 which may be used to improve the performance of the stress sensor illustrated in FIG. 3.
Figure 5:
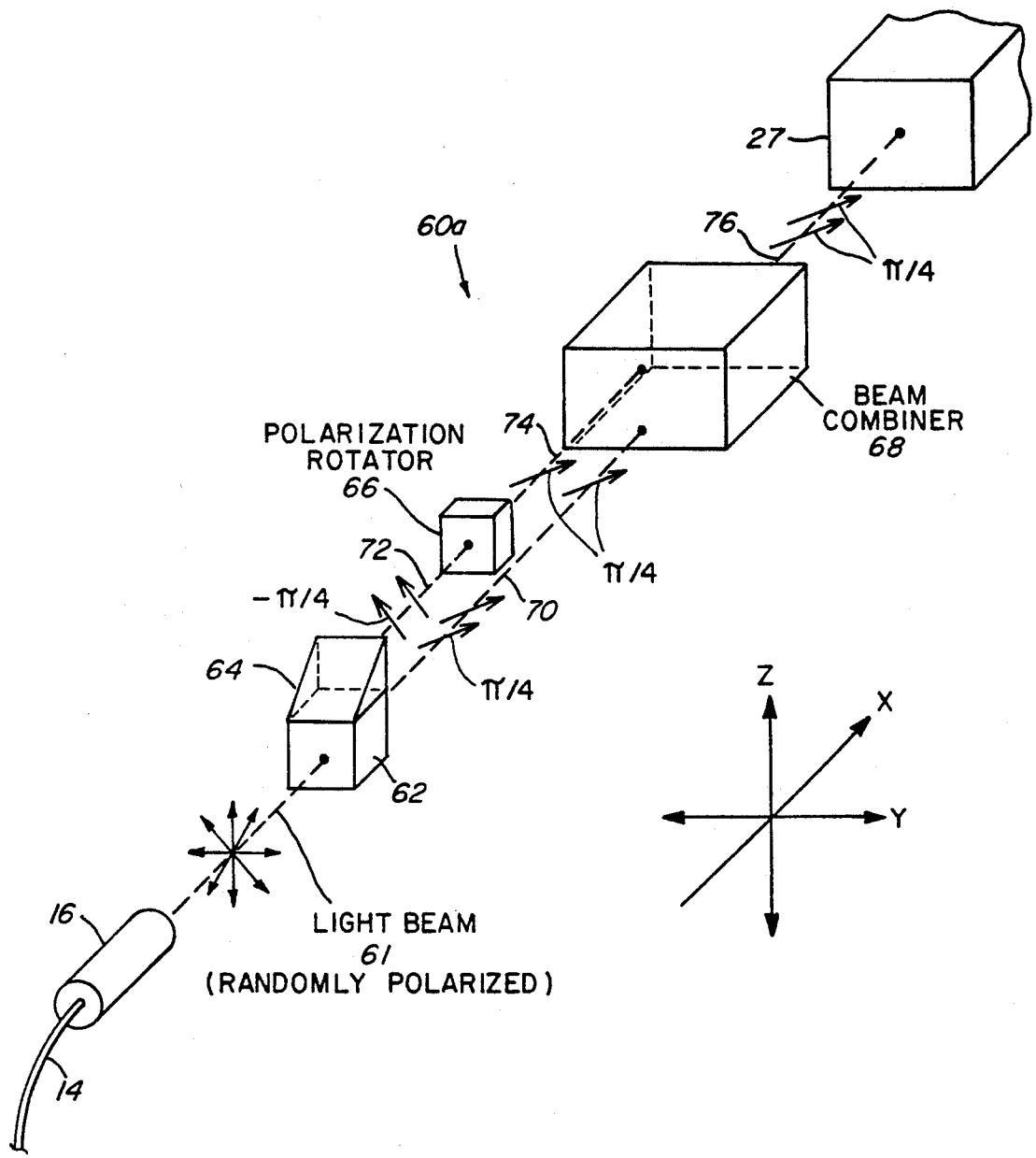
FIG. 5 is a detailed perspective view of the polarization control optics illustrated in FIG. 4.
Figure 6:
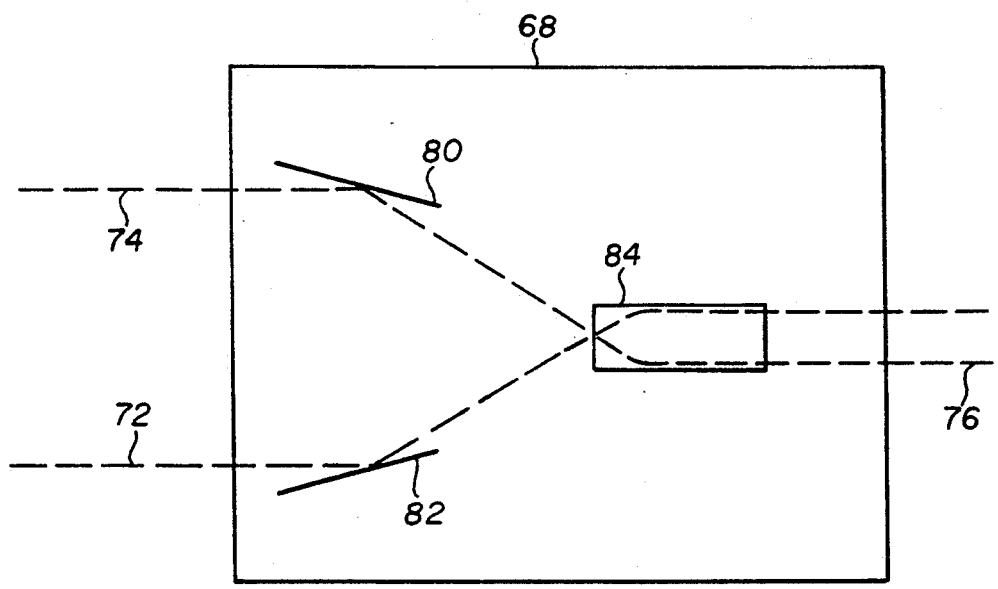
FIG. 6 illustrates a beam combiner that can be used in the polarization control optics of FIG. 5.

To prevent the loss of light intensity through polarizers 18a, 18b, 18c and to reduce the optical insertion loss of the transducer, another embodiment of the present invention substitutes polarization control optics illustrated in FIGS. 4–6 for polarizers 18a, 18b, 18c. In the embodiment of the invention illustrated in FIG. 4, polarization control optics 60a, 60b, 60c have been substituted for respective polarizers 18a, 18b, 18c. Otherwise, the components and orientations of the components remain the same as in the embodiment illustrated in FIG. 2. As will be explained in greater detail hereinafter, polarization control optics 60a, 60b, 60c are oriented so that the polarized light output by polarization control optics 60a, 60b, 60c has the same orientation as the polarized light output by polarizer 18a, 18b, 18c.

Reference is now made to FIG. 5, which illustrates in more detail polarization control optics 60a. One skilled in the art will appreciate that the explanation given applies equally to polarization control optics 60b and 60c. Referring to FIG. 5 in more detail, the polarization control optics 60a includes a light directing means 62 which may be, for example, a beam splitting polarizer similar to light directing means 24a, and a prism 64. Polarization control optics 60 also includes a polarization rotator 66 which may be a half wave plate, for example, and a light beam combiner 68. Unpolarized light 61 emerging from collimating means 16 impinges on beam splitting polarizer 62. Beam splitting polarizer 62 operates in the same manner as beam splitting polarizer 24a. In the illustrated embodiment, a portion of the input light beam 51 having a plane of polarization oriented at $\pi/4$ with respect to the X axis passes through beam splitting polarizer 62 and emerges as light beam 70. The portion of the input light beam having a plane of polarization oriented at $\pi/4$ with respect to the X axis is generally 50% of the input light intensity. The remaining 50% of the input light intensity has a plane of polarization oriented at $-\pi/4$ with respect to the X axis. The portion of the input light beam having a polarization oriented at $-\pi/4$ with respect to the X axis enters beam splitting polarizer 62 and is directed into prism 64. Light beam 72 emerging from prism 64 therefore has a plane of polarization oriented at $-\pi/4$ with respect to the X axis. Therefore, since 50% of the input light intensity is present in light beam 72 and 50% of the input light intensity is present in light beam 70, 100% of the input light intensity (neglecting losses through the components themselves) is then present in light beams 70 and 72 which emerge from beam splitting polarizer 62 and prism 64, respectively. One skilled in the art will appreciate that prism 64 is not required, but is included in a preferred embodiment to reduce the size of the polarization control optics 60a. If prism 64 is not used, polarization rotator 66 would be disposed adjacent beam splitting polarizer 62 to receive the light beam 72.

The planes of polarization of light beams 72 and 70 are different by 90°. Light beam 72 is transmitted through polarization rotator 66 which rotates the plane of polarization of light beam 72 by 90° so that the plane of polarization of light beam 74 emerging from polarization rotator 66 is along the same direction as the plane of polarization of light beam 70.

Light beams 70 and 74, now having the same plane of polarization, are transmitted to light beam combiner 68. Light beam combiner 68 merges light beams 70 and 74 together so that the emergent light beam 76 is a single light beam having a single polarization and containing substantially 100% of the input light intensity. In the embodiment illustrated in FIG. 5, which is used for optical path 42 in FIG. 4, light beam 76 is a polarized light beam having a plane of polarization oriented at $\pi/4$ with respect to the X axis. One skilled in the art will appreciate that polarization control optics 60a, 60b, 60c may be arranged so that the plane of polarization of light beam 76 can have any desired orientation. Therefore polarization control optics 60a, 60b, 60c may be readily substituted for polarizers 18a, 18b, 18c as illustrated in FIG. 4.

Reference is now made to FIG. 6, which figure depicts one illustrative embodiment of light beam combiner 68. The embodiment of FIG. 6 includes mirrors 80 and 82, along with collimating means 84. Collimating means 84 may be one of several types, such as a one quarter-pitch grin-rod (graded-index) lens available under the tradename SELFOC® or a refractive lens. Mirrors 80 and 82 are disposed to reflect light beams 74 and 70, respectively, to the grin rod lens 84 with the required angle of incidence. Grin-rod lens 84 combines light beams 74 and 70 to form light beam 76.

The polarization control optics 60a, 60b, 60c illustrated in FIGS. 5 and 6 allow the stress sensing system of the present invention to have higher overall light transmission, thereby decreasing the optical loss. The inherent 3 dB loss of input light intensity through polarizers 18a, 18b, 18c as illustrated in the embodiment of FIG. 3 can be reduced to 0.2 dB or less when the polarization control optics 60a, 60b, 60c of FIGS. 5 and 6 are substituted for polarizers 18a, 18b, 18c respectively.

Having thus described one particular embodiment of the invention, various alterations, modifications, and improvements will readily occur to those skilled in the art. Such alterations, modifications, and improvements as are made obvious by this disclosure are intended to be part of this disclosure though not expressly stated herein, and are intended to be within the spirit and scope of the invention. Accordingly, the foregoing description is by way of example only and is not intended as limiting. The invention is limited only as defined in the following claims and the equivalents thereto.

What is claimed is:

1. An optical sensing system for measuring applied stress, comprising:
    a sensing element comprising a monolithic isotropic material exhibiting stress induced birefringence;

means for establishing a first polarized light beam along a first optical path through the sensing element having a first known directional sensitivity to applied stress;

means for establishing a second polarized light beam along a second optical path through the sensing element having a second known directional sensitivity to applied stress;

means for establishing a third polarized light beam along a third optical path through the sensing element having a third known directional sensitivity to applied stress;

measuring means for measuring an optical response of each of the first, second, and third optical paths to applied stress; and determining means, responsive to the measuring means, for determining a magnitude and a direction of the applied stress.

2. The optical stress sensing system of claim 1, wherein the measuring means includes detecting means for detecting changes in transmission of light through each of the first, second, and third optical paths.

3. The optical stress sensing system of claim 2, wherein the measuring means includes sum-difference output determining means for determining a magnitude of change in transmission of light through each of the first, second, and third optical paths.

4. The optical stress sensing system of claim 3, wherein the sum-difference output determining means determines the change in magnitude according to the formula:

sum-difference output = $SIN(\Gamma(S))$ where $\Gamma(S)$ is a stress induced birefringence.

5. The optical stress sensing system of claim 4, wherein the stress sensor is disposed in an XYZ coordinate system and wherein the determining means determines the magnitude and direction of the applied stress by solving a system of equations including:

$SD_1 = [SIN \ \Gamma(S)][(COS^2\theta - (SIN^2\phi SIN^2\theta)]$ $SD_2 = [SIN \ \Gamma(S)][SIN2\theta SIN\phi]$ $SD_3 = [SIN \ \Gamma(S)][SIN2\theta COS\phi]$ where:

$SD_1$ = measured sum-difference output for the first optical path $SD_2$ = measured sum-difference output for the second optical path $SD_3$ = measured sum-difference output for the third optical path $SIN(\Gamma(S))$ = stress induced birefringence amplitude $\phi$ = the angle from the X-axis in the X-Y plane $\theta$ = the angle with the Z-axis.

6. The optical stress sensing system of claim 1, wherein the means for establishing the first, second, and third polarized light beams along each optical path includes a polarizer, a quarter-wave plate, and a light beam directing means oriented along each of the first, second, and third optical paths so that each optical path has a known directional sensitivity to applied stress.

7. The optical stress sensing system of claim 6, further comprising optical fibers for transmitting light to the polarizer in each of the first, second, and third optical paths, and optical fibers for transmitting light from the light beam directing means in each of the first, second, and third optical paths.

8. The optical stress sensing system of claim 7, further comprising collimating means for coupling the optical fibers to the polarizers and for coupling the light beam directing means to the optical fibers.

9. The optical stress sensing system of claim 8, wherein the light beam directing means in each of the first, second, and third optical paths includes a beam splitting polarizer.

10. The optical stress sensing system of claim 1, wherein the means for establishing the first, second, and third optical paths each include polarization control optics, a quarter wave plate, and a light beam directing means oriented along each of the first, second, and third optical paths so that each optical path has a known directional sensitivity to applied stress.

11. The optical stress sensing system of claim 10, wherein the polarization control optics comprises means for directing substantially all of an intensity of light incident on the polarization control optics to a respective optical path.

12. The optical stress sensing system of claim 11, wherein the means for directing substantially all of an intensity of light includes a beam splitting polarizer, a polarization rotator, and a light beam combiner means oriented along the respective optical path.

13. The optical stress sensing system of claim 10, further comprising a laser light source for providing the light incident on the polarization control optics.

14. The optical stress sensing system of claim 1, wherein the sensing element is glass.

15. An optical stress sensing system for measuring applied stress, comprising:

a sensing element including a monolithic isotropic photoelastic material;

means for establishing a first polarized light beam along a first optical path through the sensing element to transmit light from a light source;

means for establishing a second polarized light beam along a second optical path through the sensing element to transmit light from a light source;

means for establishing a third polarized light beam along a third optical path through the sensing element to transmit light from a light source;

means for measuring a sum difference optical output from each of the first, second, and third optical paths; and means, responsive to the measuring means, for determining a magnitude and a direction of the applied stress.

16. The optical stress sensing system of claim 15, wherein the means for measuring the stress induced birefringence includes means for detecting the stress induced birefringence according to the formula:

sum difference output = $SIN \ \Gamma(S)$ where $\Gamma(S)$ is a stress induced birefringence.

17. The optical stress sensing system of claim 15, wherein the determining means determines the magnitude and direction of the applied stress by solving a system of equations including:

$SD_1 = [SIN \ \Gamma(S)][(COS^2\theta - (SIN^2\phi SIN^2\theta)]$ $SD_2 = [SIN \ \Gamma(S)][SIN2\theta SIN\phi]$ $SD_3 = [SIN \ \Gamma(S)][SIN2\theta COS\phi]$ where:

$SD_1$ = measured sum-difference output for the first optical path $SD_2$ = measured sum-difference output for the second optical path $SD_3$ = measured sum-difference output for the third optical path $SIN(\Gamma(S))$ = stress induced birefringence amplitude $\phi$ = the angle from the X-axis in the X-Y plane $\theta$ = the angle with the Z-axis.

18. The optical stress sensor of claim 15, wherein the sensing element exhibits stress-induced birefringence to produce a set of fast and slow optical axes in response to the applied stress and wherein the means for determining the magnitude and the direction of the applied stress determines an orientation of the set of fast and slow optical axes in the sensing element.

19. In a stress sensing system having at least three sensors respectively having known directional sensitivity to applied stress, a method for determining a magnitude and direction of the applied stress comprising the steps of:

detecting the individual optical outputs for each sensor;

calculating a sum-difference output for each sensor; and determining, from the calculated sum-difference for each sensor, a magnitude and direction of the applied stress.

20. The method of claim 19, wherein the sum difference is calculated by sum-difference output = SIN $\Gamma(S)$ where $\Gamma(S)$ is a stress induced birefringence.

21. The method of claim 19, wherein the determining step includes solving a system of equations including:

$SD_1 = [SIN\ \Gamma(S)][(COS^2\theta - (SIN^2\phi SIN^2\theta)]$ $SD_2 = [SIN\ \Gamma(S)][SIN2\theta SIN\phi]$ $SD_3 = [SIN\ \Gamma(S)][SIN2\theta COS\phi]$ where:

$SD_1$ = measured sum-difference output for the first optical path $SD_2$ = measured sum-difference output for the second optical path $SD_3$ = measured sum-difference output for the third optical path $SIN\ (\Gamma(S))$ = stress induced birefringence amplitude $\phi$ = the angle from the X-axis in the X-Y plane $\theta$ = the angle with the Z-axis.

22. An optical stress sensing system for measuring applied stress, comprising:

a planar stress sensing element comprising a monolithic isotropic material exhibiting stress induced birefringence;

a first optical stress sensor having a first light path through the sensing element for transmitting light polarized along a first plane and having a first known directional sensitivity to applied stress;

a second optical stress sensor having a second light path through the sensing element for transmitting light polarized along a second plane and having a second known directional sensitivity to applied stress;

a third optical stress sensor having a third light path through the sensing element for transmitting light polarized along a third plane and having a third known directional sensitivity to applied stress;

a light measuring device for detecting a change in light transmission in each of the three optical paths; and a calculator for calculating a magnitude and direction of the applied stress as a function of the change in light transmission measured by the light measuring device.

23. The optical stress sensing system of claim 22, wherein the first and second light paths are parallel to each other and the third light path is orthogonal to the first and second light paths.

24. The optical stress sensor of claim 23, wherein the first and third planes are the orthogonal to each other and the second plane polarization is oriented at $\pi/4$ with respect to the first plane.

* * * * *